(12) United States Patent
Kordon et al.

(10) Patent No.: US 7,654,106 B2
(45) Date of Patent: Feb. 2, 2010

(54) NO-FROST REFRIGERATOR

(75) Inventors: Rolf Kordon, Giengen (DE); Renate Pradel, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 323 days.

(21) Appl. No.: 10/529,046

(22) PCT Filed: Oct. 16, 2003

(86) PCT No.: PCT/EP03/11499

§ 371 (c)(1), (2), (4) Date: Mar. 24, 2005

(87) PCT Pub. No.: WO2004/040211

PCT Pub. Date: May 13, 2004

(65) Prior Publication Data

US 2006/0005566 A1 Jan. 12, 2006

(30) Foreign Application Priority Data

Oct. 29, 2002 (DE) .............................. 102 50 393

(51) Int. Cl.
F25D 17/04 (2006.01)
(52) U.S. Cl. .............................. 62/408; 62/187; 62/413
(58) Field of Classification Search ............... 62/187, 62/408, 411, 412, 413, 414, 417; 70/14, 70/18, 58, 180, 158, 163–169
See application file for complete search history.

(56) References Cited

U.S. PATENT DOCUMENTS

| 2,914,364 | A | * | 11/1959 | Ross ........................... 384/477 |
| 3,517,949 | A | * | 6/1970 | Kaneko et al. ............... 285/9.2 |
| 3,952,542 | A | | 4/1976 | Berkowitz |
| 4,009,590 | A | * | 3/1977 | Webb et al. ................... 62/180 |
| 4,229,945 | A | * | 10/1980 | Griffin et al. ................. 62/229 |
| 4,852,361 | A | * | 8/1989 | Oike ............................ 62/131 |
| 4,920,758 | A | * | 5/1990 | Janke et al. ................... 62/187 |
| 5,369,963 | A | * | 12/1994 | Pickles et al. ................ 62/408 |
| 5,490,395 | A | * | 2/1996 | Williams et al. ............. 62/187 |
| 5,711,159 | A | * | 1/1998 | Whipple, III ................. 62/82 |
| 5,876,014 | A | * | 3/1999 | Noritake et al. ........ 251/129.12 |
| 5,970,736 | A | * | 10/1999 | Gong et al. ................... 62/408 |
| 6,006,529 | A | * | 12/1999 | Ji et al. ......................... 62/186 |

(Continued)

FOREIGN PATENT DOCUMENTS

DE 79 24 975 U1 6/1987

(Continued)

OTHER PUBLICATIONS

International Search Report for PCT/EP2003/011499.

*Primary Examiner*—Ljiljana (Lil) V Ciric
(74) *Attorney, Agent, or Firm*—James E. Howard; Andre Pallaples

(57) ABSTRACT

A no-frost refrigerator having an opening in a separating wall for the through passage of air between a storage chamber and an evaporation chamber. A control element is arranged in the opening and can be displaced or shifted between positions in which the control element covers the opening to different extents. The control element can be rotated about an axis substantially perpendicular to an axis or plane of the air passage opening.

17 Claims, 7 Drawing Sheets

U.S. PATENT DOCUMENTS

| | | | |
|---|---|---|---|
| 6,094,932 A * | 8/2000 | Chiappetta | 62/408 |
| 6,240,735 B1 | 6/2001 | Kolson et al. | |
| 6,725,678 B2 * | 4/2004 | Chang et al. | 62/156 |
| 6,725,680 B1 * | 4/2004 | Schenk et al. | 62/186 |
| 6,951,211 B2 * | 10/2005 | Bryant | 123/559.1 |
| 7,108,335 B2 * | 9/2006 | Morris | 301/111.01 |
| 2003/0098660 A1 * | 5/2003 | Erdman et al. | 318/254 |
| 2003/0188547 A1 * | 10/2003 | Jeon | 62/408 |

FOREIGN PATENT DOCUMENTS

| | | |
|---|---|---|
| DE | 198 06 041 A1 | 8/1999 |
| FR | 2 488 500 A1 | 2/1982 |
| JP | 2060412 B | 12/1990 |
| WO | WO 02/16843 A1 | 2/2002 |

* cited by examiner

NO-FROST REFRIGERATOR

The present invention relates to a no-frost refrigerator. Such a refrigerator conventionally comprises in a heat-insulating housing a storage chamber for accommodating cool goods and an evaporation chamber, in which an evaporator is arranged and which is connected to the storage chamber via an air passage. Air is circulated between both chambers to cool the storage space via the air passage. The separation of storage chamber and evaporation chamber enables the evaporator to defrost when required, without this necessarily leading to heating of the storage chamber.

For the purposes of regulating the strength of the air exchange between evaporation chamber and storage chamber and to prevent this air exchange as fully as possible when the evaporator defrosts, a control body, which can be shifted between different positions, is usually provided in the air passage of such a unit, in which it covers the free cross-section of an air passage opening in the air passage to different extents. There are diverse constructions of such control bodies in use, e.g. flaps pivotable about an axis, slides displaceable in the plane of the air passage opening etc. In the case of a slide there is the risk that it will freeze solid on the wall surfaces limiting the air passage opening and accordingly cannot fulfil its task at least temporarily.

The problem of freezing solid can be reduced in a suitably constructed flap, though the disadvantage here is that to swing out it requires considerable spatial depth, which adds up to lost useable volume for the storage space. It would be conceivable to reduce this space requirement, where a plurality of narrow flaps is used in place of a single wide flap, yet this detracts from the robustness of the refrigerator and adds costs to its manufacture.

The aim of the invention is to provide a no-frost refrigerator with a robust regulating mechanism for air exchange between both chambers, in which both the risk of freezing solid and space requirement are minimised.

This task is solved according to the present invention by a refrigerator having the features of Claim 1.

Through rotatability of the control body about an axis vertical to the plane of the air passage opening a minimal structural depth of the respective position of the control body independent of the regulating mechanism is achieved, which also enables the rotatable suspension of the control body, to avoid any contact between the control body and parts bearing it downstream of the axis. But possible freezing solid in the immediate vicinity of the axis does not give rise to any serious problems, since the control body can break lose with minimal expenditure of force.

The air passage opening is preferably formed directly in a partition between storage chamber and evaporation chamber; alternatively it could also be formed in a wall of a channel connecting the two chambers.

The passage opening extends with respect to the axis of revolution through an angle of less than 180°, so that a recess congruent with the air passage opening of the control body can constantly be brought into a position, in which air passages and recesses do not securely overlap.

The control body is preferably formed as a circular disc. This facilitates its arrangement in a cylindrical housing, and the edge of such a control body can also be easily embodied as a cam disk, which can be used for controlling a drive motor in particular for the control body by means of a switch.

The axis is preferably formed by a shaft of a drive motor of the control body, taken up in a sleeve of the control body. To anchor the control body solidly on the shaft, though still easily detachable, a locking element can be provided which crosses slots of the sleeve and of the shaft oriented in a common plane and formed obliquely to the axis and thus blocks axial shift of both against one another.

The locking element is preferably held at one end on the control body and has an elastically mobile second end. Through displacement of the locking element out of one of the slots the axial coupling of the control body can be lifted on the shaft.

And to protect the locking element or to prevent interlocking of foreign bodies, the locking element is preferably set in between the control body and a wall, on which the control body is swivel-mounted, in particular the partition, and its capacity for actuation and detachability is guaranteed, in that in the control body a hole is made, through which the free end of the locking element can be activated, if required by means of a tool.

It is also preferred that the air passage opening is formed in a substantially cylindrical shell element, inserted into a wall such as the partition. This shell element can be pre-mounted along with the control body as an assembly and then set into a recess of the wall provided for this purpose, through which assembly of the refrigerator is facilitated.

A heating unit can be provided on the periphery of the shell element, to securely exclude freezing solid of the control body in the vicinity of its peripheral surface.

The abovementioned drive motor for the control body is preferably likewise pre-mounted on the shell element, to be placed in the refrigerator jointly with the latter.

To prevent flow-obstructing turbulence and the penetration of moisture between the control body on the one hand and the partition or respectively the shell element on the other hand as extensively as possible, a support facing the control element is preferably formed on the air passage opening.

To prevent moisture adhering to the support from reaching the shaft, the walls of the support above the shaft are preferably convex in an upwards direction.

Further features and advantages of the invention will emerge from the following description of an embodiment with reference to the attached figures, in which:

FIG. 1, FIG. 2 in each case are exploded diagrams of the individual components of an assembly for air passage regulation on a partition of a no-frost refrigerator, FIG. 3 is a perspective view of an outer shell of the assembly, FIG. 4 is a perspective view of the control body of the assembly, FIG. 5 is a detail of the control body in plan view, FIG. 6 is a partially cut-away plan view of the front side of the assembly, and FIG. 7 is a perspective view of the rear side of the assembly.

Figure 1:
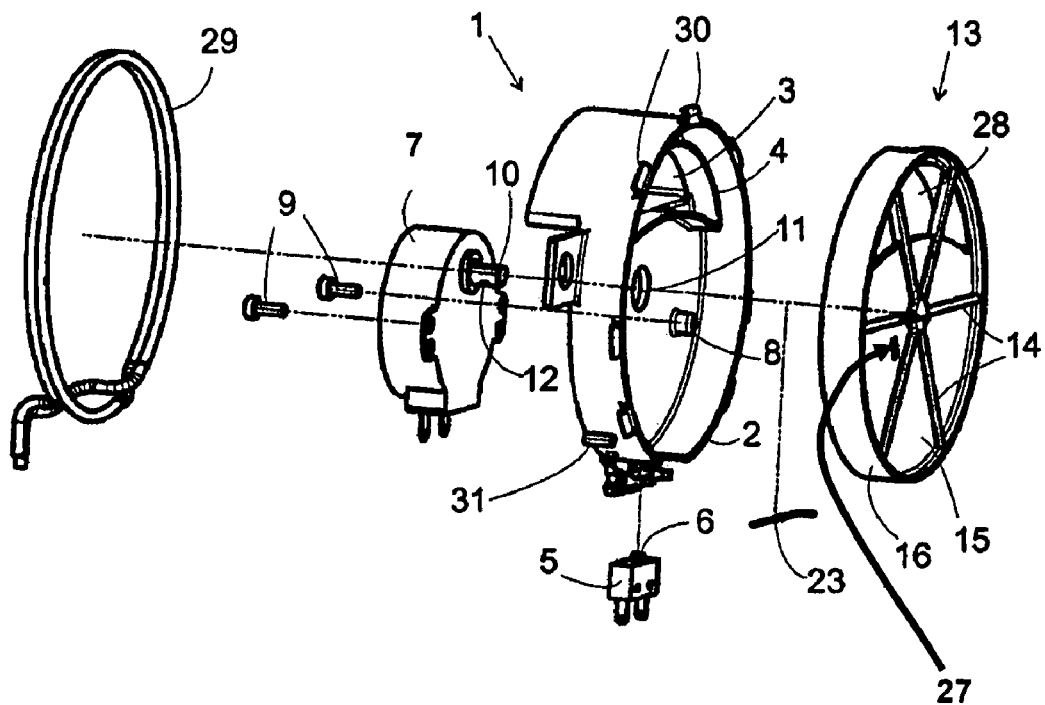
Figure 2:
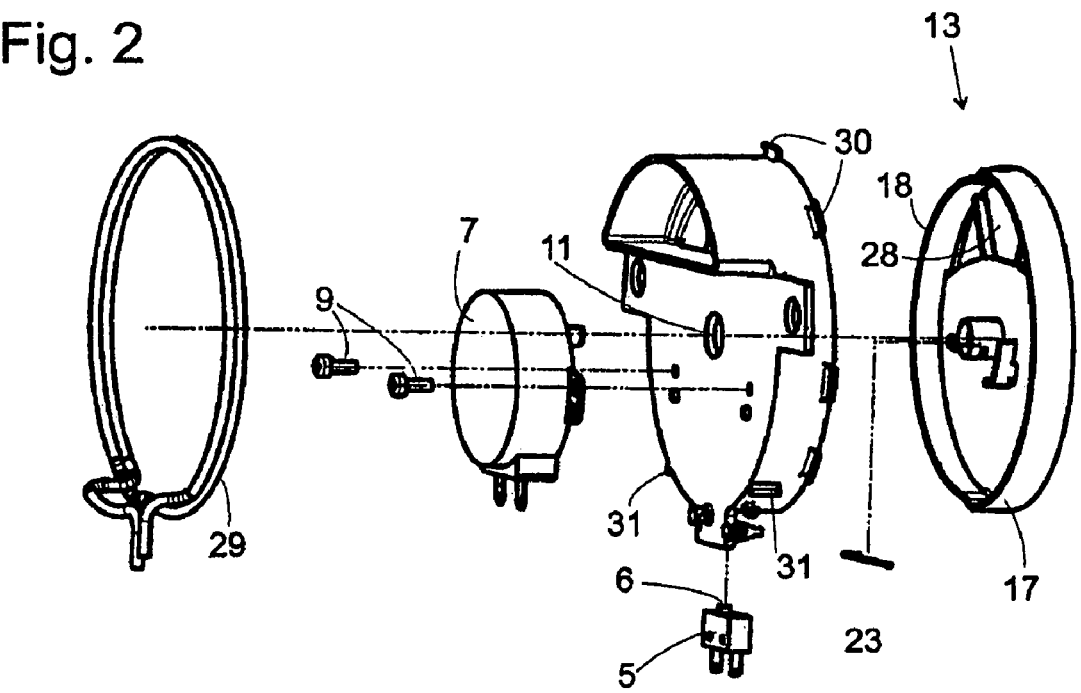
Figure 3:
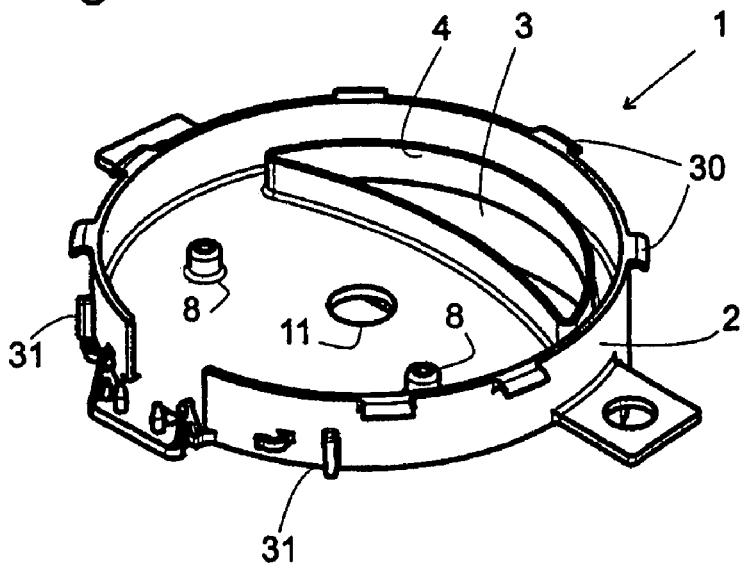
Figure 8:
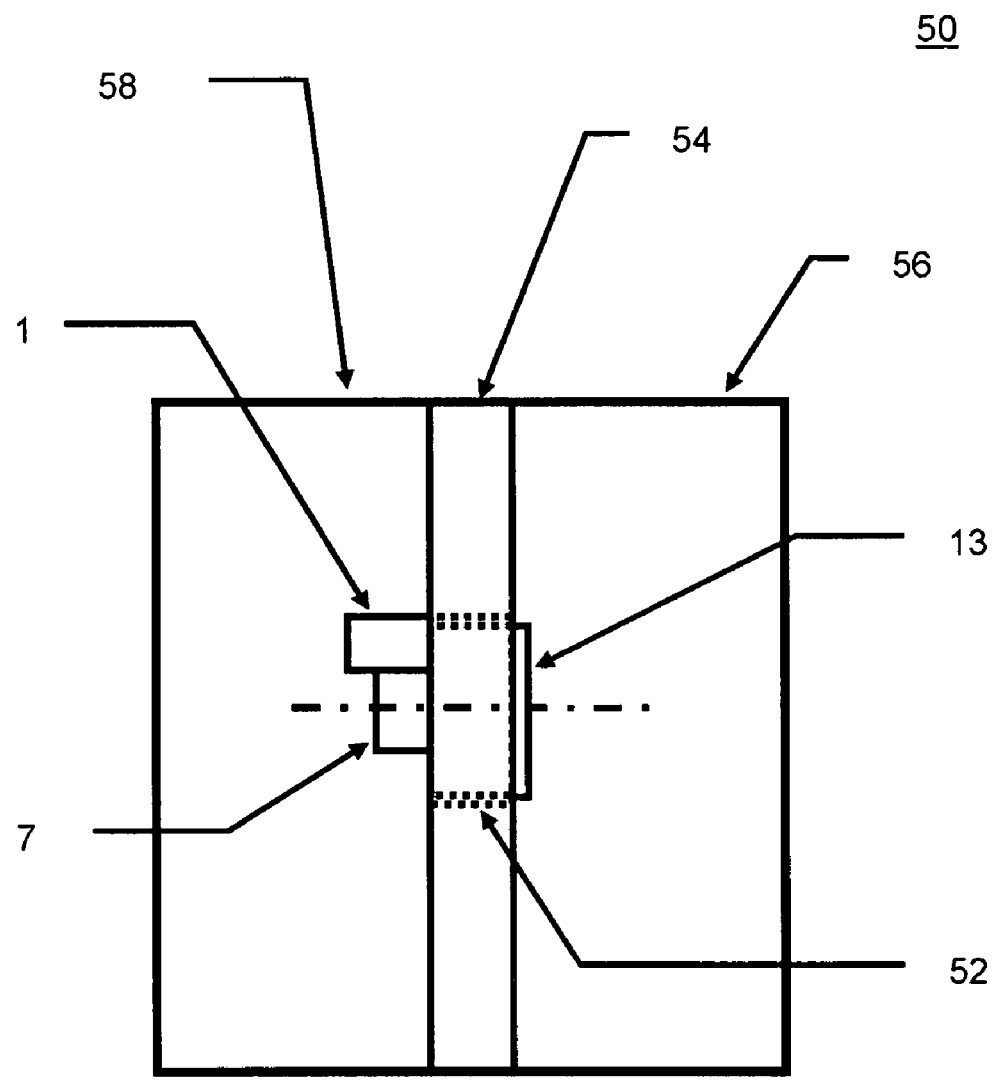
FIG. 8 is a schematic side view of an assembly of an air passage regulation on a partition of a no-frost refrigerator.

FIGS. 1 and 2 are in each case perspective exploded views of an assembly, provided to be mounted on a passage or in a passage 52 of a partition 54 between the storage chamber 56 and the evaporation chamber 58 of a no-frost refrigerator 50, as shown in FIG. 8, preferably directly below the cover of the storage chamber, to form an air passage opening with an adjustable cross-section. FIG. 1 shows the assembly more from the front side and FIG. 2 more from the rear. The descriptions front and rear sides are selected at random. The assembly can be mounted in the partition with the front side facing the evaporation chamber and the rear side facing the storage chamber, or vice versa, whereby however the arrangement of the rear side facing the storage chamber is preferred for the configuration shown here.

The assembly is composed substantially of a flat cylindrical shell 1, open on a front side, which forms an outer limit of the assembly, and whereof the cylindrical outer wall 2 in the mounted state is built into the circular passage of the partition. The shell 1 and the partition thus form a partition between evaporation chamber and storage chamber, which is closed up to an air passage opening 3 formed in the shell 1 itself. The fitting position of the assembly is selected such that the air passage opening 3 is as high as possible.

A short support 4 with a sickle-shaped cross-section is formed on the inside of the floor of the shell 1 and extends in its inner space. An outer wall section of the support 4 extends at a short distance to the outer wall 2 of the shell 1 concentric thereto. An inner wall section of the support 4 is likewise curved like the arc of a circle, with a lesser radius of bending than the outer wall section.

The outer wall 2 is pierced at a point on its periphery to form a mounting for a key button 5, from which a stylus 6 projects into the interior of the shell 1 when in the mounted state.

An electromotor 7, preferably a synchronous geared motor or a stepped motor, is provided for mounting on an outer face of the floor of the shell 1. Two hollow trunnions 8, provided to take up the thread of screws 9 for fastening the electromotor 7, extend from the floor of the shell 1 into its inner space. A shaft 10 of the motor engages through a central bore 11 of the shell 1 into its inner space. As shown in FIG. 1 the shaft 10 is fitted with a slot 12 oriented obliquely to the axis.

A control body 13, provided for mounting in the interior of the shell 1, has a form similar to that of a wheel, with a wheel disc 15 stiffened by spokes 14 and a peripheral surface 16 enclosing the wheel disc 15. The peripheral surface 16 is circular on its front side, as evident in FIG. 1; towards the rear it is formed as a cam disk, with two sections 17, 18 of differing radius, which extend in each case over approximately half the periphery of the control body 13. At the same time the radii of the sections 17, 18 are selected such that at least the section 17 with the greater radius, when it lies before the key button 5, presses its stylus 6 in and thus holds an electrical contact of the key button 5 open (or closed), which is closed (or open) is when the section 18 with the lesser radius is opposite the key button 5.

Figure 4:
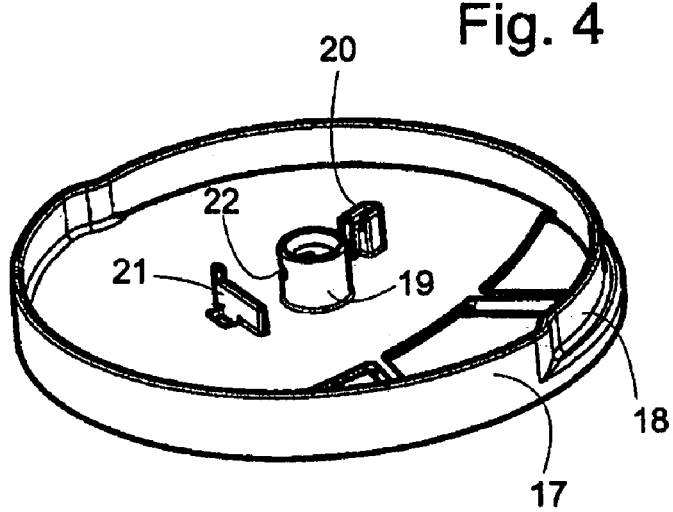
Figure 5:
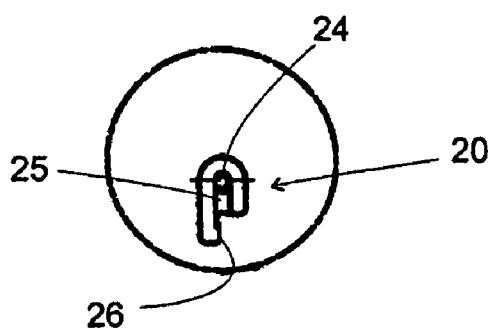
Figure 9:
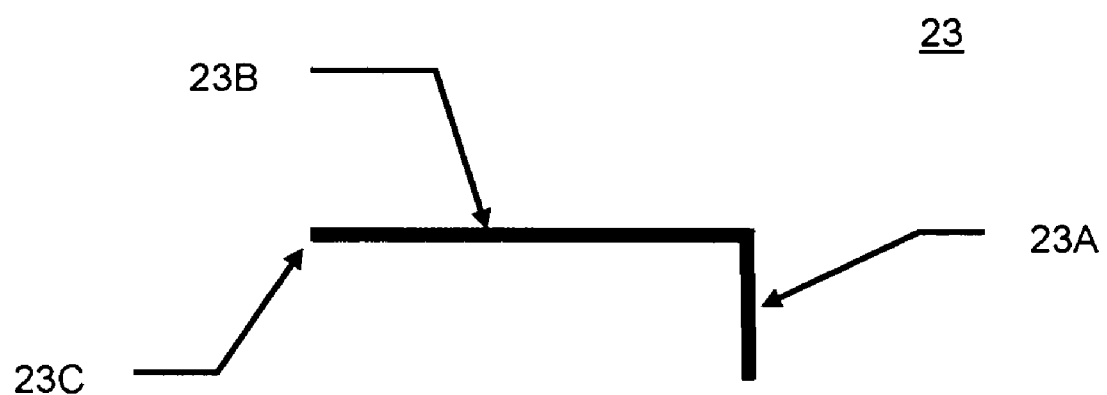
FIG. 9 is a schematic plan view of a locking element.
Figure 10:
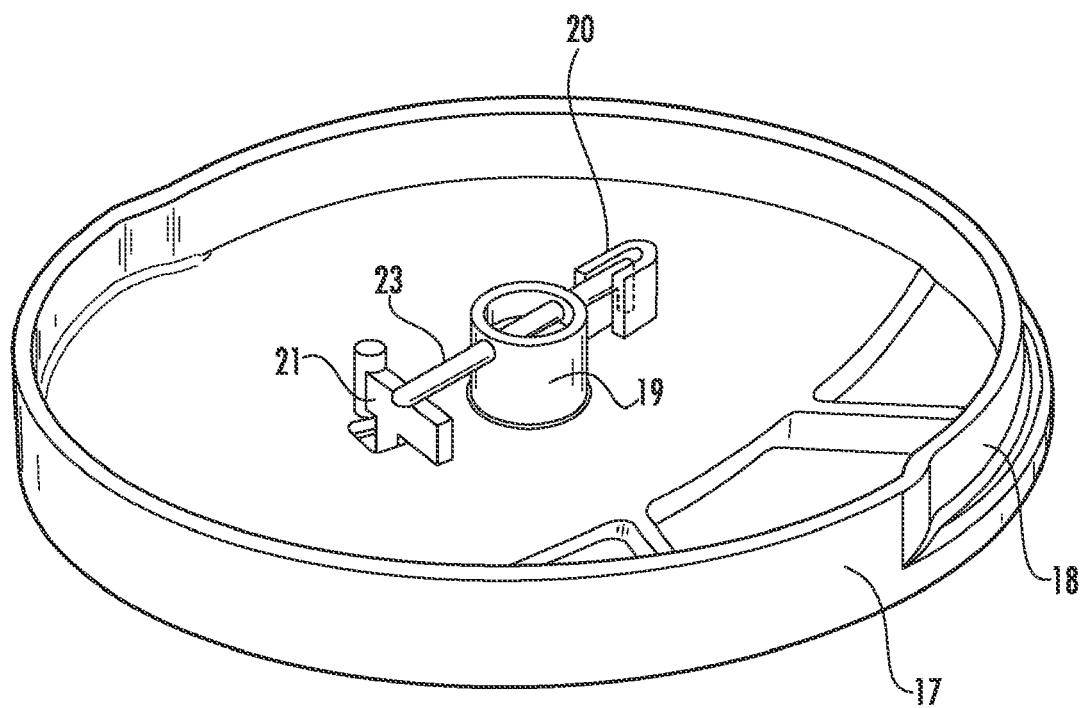
FIG. 10 is a perspective view of the control body and locking element assembly.
Figure 11:
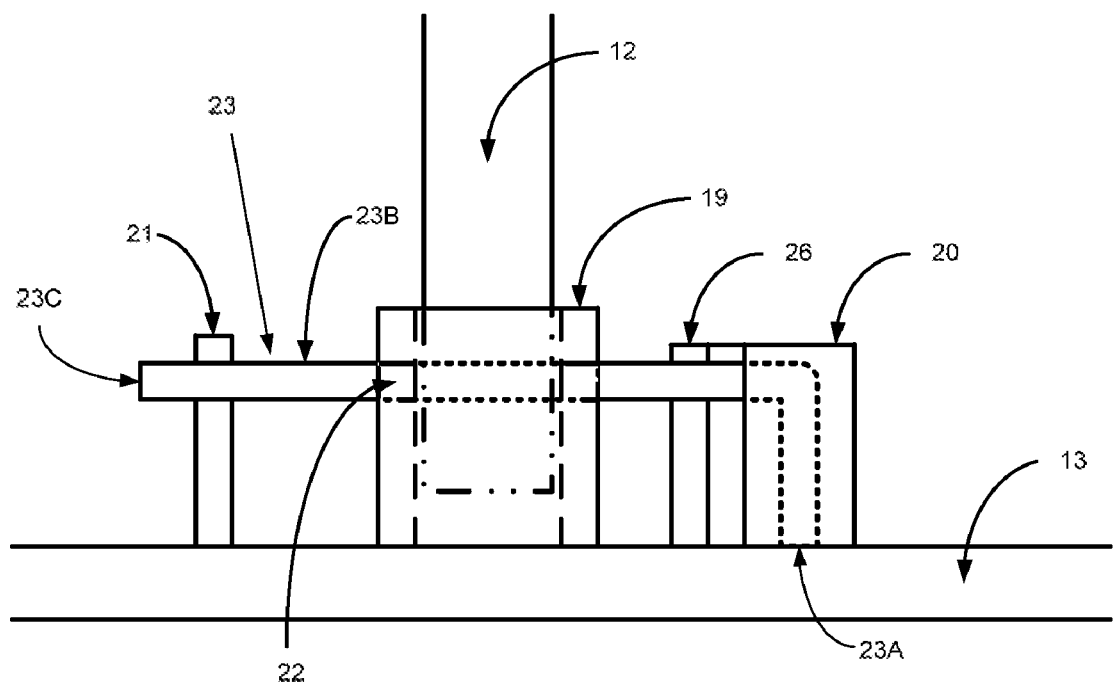
FIG. 11 is a side view of the control body and locking element assembly.

Formed on the inside of the wheel disc 15 facing the floor of the shell 1 (see also FIG. 4) are a central support 19, a shaft 20 shown in FIG. 5 in enlarged plan view and a leg 21. The support 19 is provided to take up the shaft 10 of the electromotor 7 positively and non-positively. Formed laterally in the support 19 is a slot 22, which, when the shaft 10 is guided correctly into the support 19, lies in a plane with its slot 12. The shaft 20 and the leg 21 serve as mounting for a locking element 23 (see FIG. 1, 2) in the form of an L-shaped bent flexible wire, as shown in FIG. 9. The position of the support 19, the shaft 20, the leg 21 and the locking element 23 are evident in particular in FIG. 6, which shows a partially cut-away plan view of the inventive assembly. A shorter leg 23A of this locking element 23 is inserted into the bore 24 of the shaft 20; its longer section, which is longer leg 23B, runs through a channel 25 at the free end of the shaft 20 and is held by a projection 26 formed on the shaft 20 under flexural loading, which holds the longer leg 23B inserted in the slots 12, 22. The free end 23C of the longer leg 23B lies on the free edge of the leg 21 and crosses a hole 27, formed in the wheel disc 15. By introducing a tool through the hole 27 and shifting the longer leg 23B of the locking element 23 downwards in FIG. 6, the longer leg 23B can be pulled out of the slots 12, 22, and the control body 13 can be removed from the shell 1.

Figure 6:
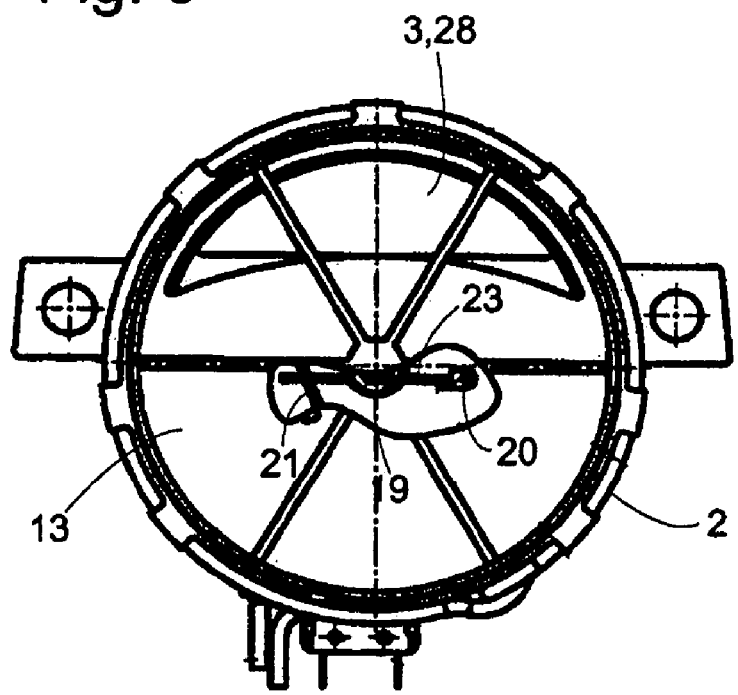

In the configuration of the assembly shown in FIG. 6 a window 28 of the control body 13 and the support 4 are covered congruently on the air passage opening of the shell 1. The key button 5 lies opposite the peripheral surface 16 in the direct vicinity of a transition between the sections 17,18. In order to close the air passage opening 3, a drive circuit drives the electromotor 7 (not illustrated) connected to the key button 5 to a revolution in a fixed direction, until it recognises a change in the contact state of the key button 5, from conductive to non-conductive or vice versa. Whenever this is the case, the control body 13 has performed a revolution of 180°, the air passage opening 3 is blocked, and the key button 5 is again located in the immediate vicinity of a transition between the sections 17,18. To reopen the air passage opening 3, it is also sufficient to drive the electromotor 7 until a change in the contact state of the key button 5 is detected.

Figure 7:
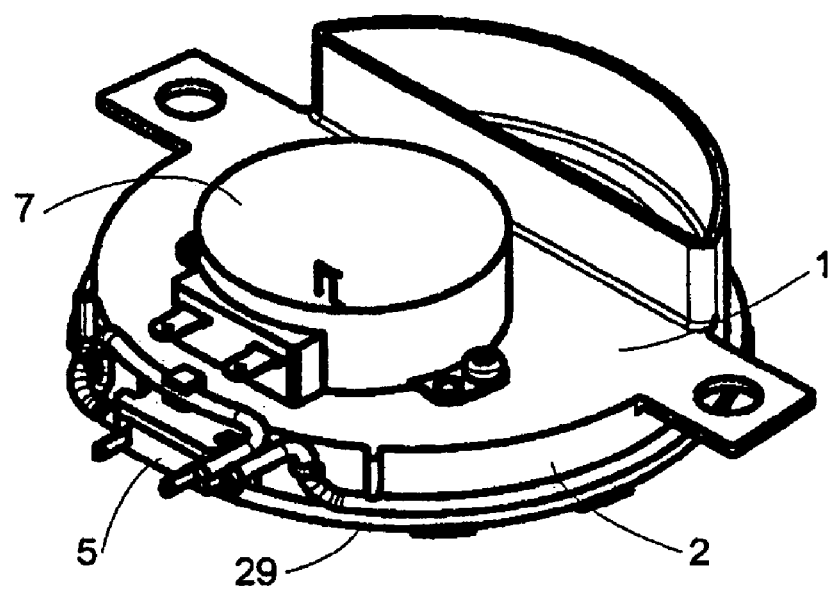

A heating unit in the form of a resistance wire 29 is mounted on the outside of the shell 1. It is fixed between a plurality of claws 30, extending from the fore edge of the shell 1 outwards, and the tips of legs 31 formed on the peripheral surface of the shell 1 facing these claws 30. The resistance wire 30 prevents freezing of incoming water drops between the peripheral surface 16 of the control body 3 and the opposite outer wall 2 of the shell 1, which might lead to freezing solid of the control body 13. Heating of other regions of the assembly is not necessary, and in any case there is still corporeal proximity adequate for freezing solid between mobile and non-mobile parts of the assembly, on which ice could build up, in the immediate vicinity of the shaft 10. The shaft 10 is protected from moisture flowing down from above by the projecting support 4 and in particular by its cross-sectional form, which optionally deflects water drops present on it or the shell 1 in a lateral direction, away from the shaft 10. Also, there is high torque of the motor 7 available in the immediate vicinity of the shaft 10 to break up a frozen-solid site. Because the motor 7 is attached in direct contact with the shell 1, as shown in FIG. 7, if the motor is supplied with operating voltage by the drive circuit for a longer time, corresponding rotation of the control body can also be detected without the key button 5 and the motor again switched off, and the operating heat of the motor 7 results in a frozen-solid site in the region of the shaft 10 defrosting again and the control body can be rotated again.

The invention claimed is:

1. A no-frost refrigerator, comprising:
   a storage chamber;
   an evaporation chamber;
   an air passageway having a plane and enabling air exchange between said storage chamber and said evaporation chamber;
   said air passageway having an air passage opening having a cross-section;
   a control body arranged on said air passage opening;
   said control body shiftable between positions in which said control body variously covers said cross-section of said air passage opening;
   said control body rotatable about an axis substantially perpendicular to said air passageway plane; and,
   a wall between the storage chamber and the evaporation chamber; a substantially cylindrical shell element formed with said wall; and, said air passage opening formed in said cylindrical shell element.

2. The no-frost refrigerator according to claim 1, including a partition formed between said storage chamber and said evaporation chamber and said air passageway is formed through said partition.

3. The no-frost refrigerator according to claim 1, including said control body is formed as a substantially circular disc.

4. The no-frost refrigerator according to claim 3, including said circular disc has a peripheral surface formed as a cam disk.

5. The no-frost refrigerator according to claim 4, including a drive motor for driving said control body to shift positions and including a switch attached to said partition interacts with said cam disk for controlling said control body drive motor.

6. The no-frost refrigerator according to claim 1, including a heating element attached to a periphery of said cylindrical shell element.

7. The no-frost refrigerator according to claim 1, including a drive motor mounted for rotating said control body on said cylindrical shell element.

8. The no-frost refrigerator according to claim 1, including a support formed on said air passage opening facing said control body.

9. A no-frost refrigerator, comprising:
a storage chamber;
an evaporation chamber;
an air passageway having a plane and enabling air exchange between said storage chamber and said evaporation chamber;
said air passageway having an air passage opening having a cross-section; and
a control body arranged on said air passage opening;
said control body shiftable between positions in which said control body variously covers said cross-section of said air passage opening;
said control body rotatable about an axis substantially perpendicular to said air passageway plane,
said control body axis being formed by a shaft of a drive motor for driving said control body to shift positions, said shaft extending through a sleeve formed in said control body.

10. The no-frost refrigerator according to claim 9, including a support formed on said air passage opening, said support having convex upwardly walls above said shaft.

11. The no-frost refrigerator according to claim 9, including said shaft and said sleeve each have a slot formed therein in a plane oriented diagonally to said axis and a locking element is engaged in said slots to lock said shaft and said control body together.

12. The no-frost refrigerator according to claim 11, wherein the locking element is an L-shaped flexible locking element.

13. The no-frost refrigerator according to claim 11, including said locking element having a first end fixedly secured in said control body and said locking element having an elastically mobile second end, said elastically mobile second end can be displaced to displace said locking element from at least one of said slots.

14. The no-frost refrigerator according to claim 13, including said locking element enclosed between said control body and a wall between the storage chamber and the evaporation chamber, said control body swivel-mounted on said wall and a free end of said locking element can be activated through a hole formed in said control body.

15. The no-frost refrigerator according to claim 13, wherein the first end of the locking element is perpendicular to the second end of the locking element.

16. The no-frost refrigerator according to claim 13, wherein the control body includes a shaft having a bore formed therein, and a leg having a fixed end and a free end,
wherein the shaft is formed on an opposite side of the sleeve from the leg,
wherein the first end of the locking element is fixedly secured in the bore of the shaft of the control body, and
wherein the second end of the locking element is supported by the free end of the leg.

17. A no-frost refrigerator, comprising:
a storage chamber;
an evaporation chamber including an evaporator;
an air passageway having a plane and enabling air exchange between said storage chamber and said evaporation chamber;
a control body arranged on an air passage opening,
wherein the control body is rotatable about an axis substantially perpendicular to the air passageway plane,
wherein the control body axis is formed by a shaft of a drive motor for driving said control body to shift positions,
wherein the shaft of the drive motor extends through a sleeve formed in the control body, and
wherein the shaft of the drive motor and the sleeve of the control body each have a slot formed therein; and
a locking element that is engaged in the slot of each of the shaft of the drive motor and the sleeve of the control body to lock the shaft of the drive motor and the control body together.

* * * * *

UNITED STATES PATENT AND TRADEMARK OFFICE
CERTIFICATE OF CORRECTION

PATENT NO. : 7,654,106 B2 Page 1 of 1
APPLICATION NO. : 10/529046
DATED : February 2, 2010
INVENTOR(S) : Kordon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this

Twenty-third Day of November, 2010

David J. Kappos
*Director of the United States Patent and Trademark Office*